(12) United States Patent
Seo et al.

(10) Patent No.: US 10,133,123 B2
(45) Date of Patent: Nov. 20, 2018

(54) LIQUID CRYSTAL PHOTO ALIGNMENT AGENT AND METHOD OF MANUFACTURING LIQUID CRYSTAL DISPLAY USING THE SAME

(71) Applicant: Samsung Display Co., Ltd., Yongin-Si, Gyeonggi-Do (KR)

(72) Inventors: Bongsung Seo, Suwon-si (KR); Min-sik Jung, Yongin-si (KR); Baekkyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 15/196,596

(22) Filed: Jun. 29, 2016

(65) Prior Publication Data
US 2017/0123254 A1   May 4, 2017

(30) Foreign Application Priority Data
Nov. 2, 2015   (KR) .................. 10-2015-0153343

(51) Int. Cl.
*G02F 1/1337* (2006.01)
*C09K 19/56* (2006.01)
*G02F 1/1335* (2006.01)

(52) U.S. Cl.
CPC .......... *G02F 1/13378* (2013.01); *C09K 19/56* (2013.01); *G02F 1/133514* (2013.01); *G02F 1/133788* (2013.01)

(58) Field of Classification Search
USPC .............................................. 378/156–159
See application file for complete search history.

(56) References Cited

U.S. PATENT DOCUMENTS

| | | | |
|---|---|---|---|
| 2005/0224754 A1* | 10/2005 | Hirai .................. | C09K 19/2007 252/299.01 |
| 2012/0229744 A1* | 9/2012 | Hattori ..................... | C08F 2/50 349/124 |

(Continued)

FOREIGN PATENT DOCUMENTS

| | | |
|---|---|---|
| JP | 634979 | 2/1994 |
| JP | 9265096 A | 10/1997 |

(Continued)

*Primary Examiner* — Ashok Patel
(74) *Attorney, Agent, or Firm* — Cantor Colburn LLP

(57) ABSTRACT

Provided is a liquid crystal photo alignment agent including: a solid including at least one of a polyimide polymer, cyclobutane dianhydride (CBDA) or diamine; a first solvent including at least one of N-methyl-2-pyrrolidone, N-ethyl-2-pyrrolidone, dimethyl sulfoxide, dimethyl formamide, γ-butyrolacton or propylene carbonate; and a second solvent including at least one of propylene glycol monobutyl ether, dipropylene glycol monomethyl ether, propylene glycol n-propyl ether, diethylene glycol diethyl ether or diacetone alcohol, wherein the first solvent is included in an amount of about 50 wt % to about 80 wt % based on the total weight of the liquid crystal photo alignment agent; and the second solvent is included in an amount of about 15 wt % to about 40 wt % based on the total weight of the liquid crystal photo alignment agent. Also provided is a method of manufacturing a liquid crystal display including the liquid crystal photo alignment agent.

10 Claims, 10 Drawing Sheets

(56) References Cited

U.S. PATENT DOCUMENTS

| | | | |
|---|---|---|---|
| 2013/0101755 A1* | 4/2013 | Lee | G02F 1/133707 |
| | | | 428/1.23 |
| 2016/0264867 A1* | 9/2016 | Kunimi | C08G 73/10 |
| 2017/0227820 A1* | 8/2017 | Furusato | G02F 1/133723 |

FOREIGN PATENT DOCUMENTS

| | | | |
|---|---|---|---|
| JP | 2014206718 A | | 10/2014 |
| KR | 101267528 B1 | | 5/2013 |
| KR | 1020140029167 A | | 3/2014 |
| KR | 1020150067335 A | | 6/2015 |
| WO | WO 2015060360 | * | 4/2015 |

* cited by examiner

FIG. 1
Example 1
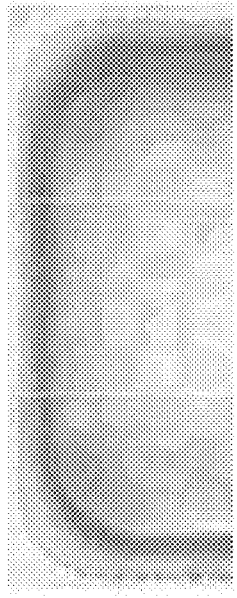
Example 2
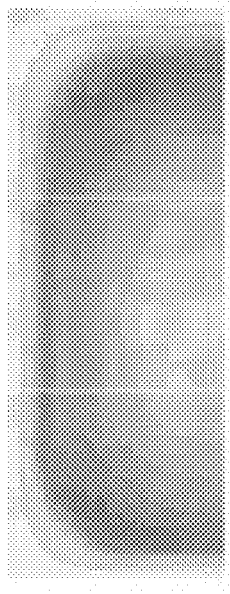
Example 3
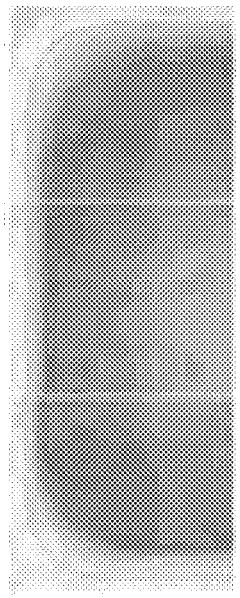
Example 4
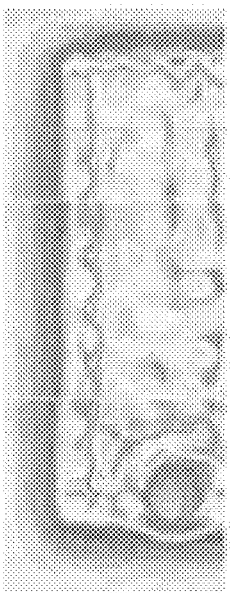
Example 5
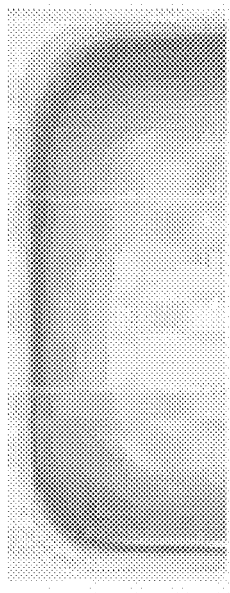
Example 6
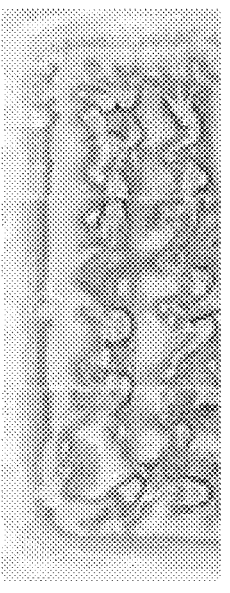

FIG. 9
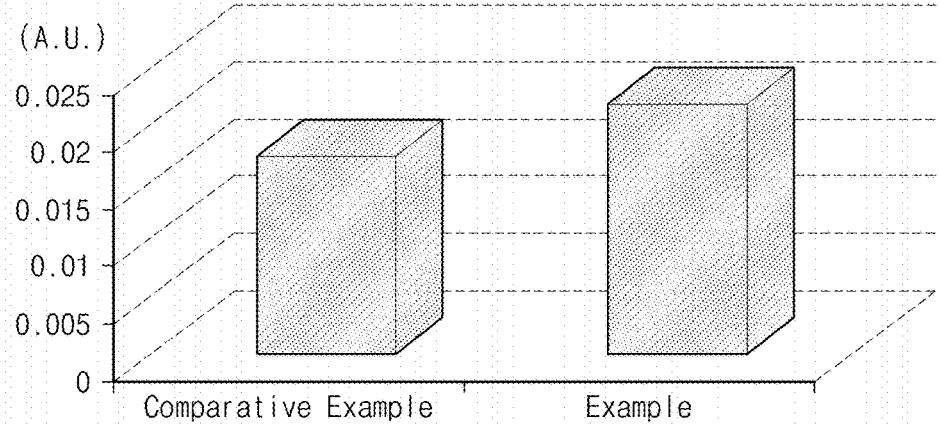
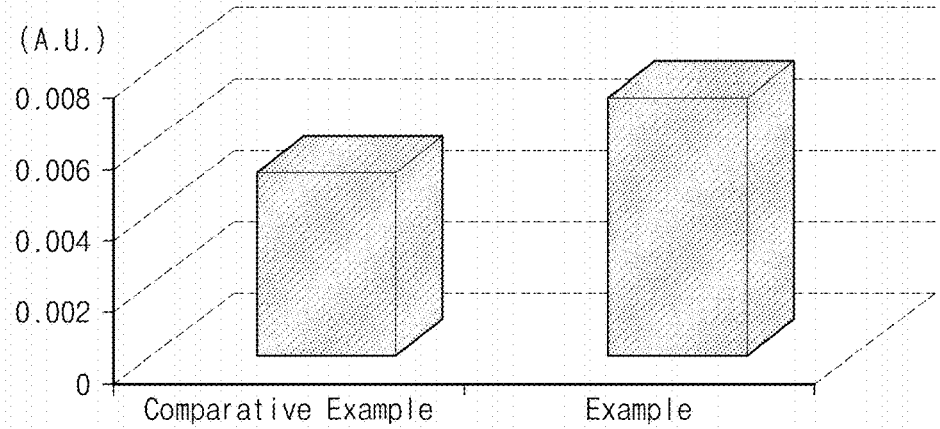
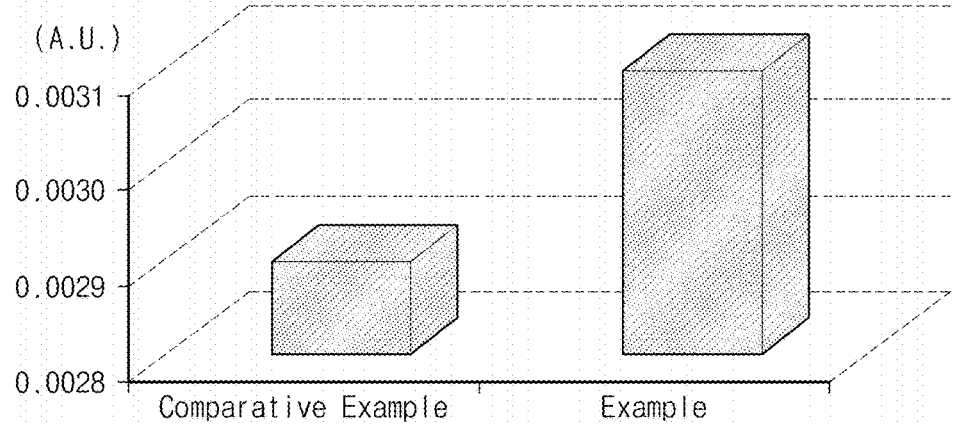

LIQUID CRYSTAL PHOTO ALIGNMENT AGENT AND METHOD OF MANUFACTURING LIQUID CRYSTAL DISPLAY USING THE SAME

CROSS-REFERENCE TO RELATED APPLICATIONS

This U.S. non-provisional patent application claims the benefit and priority under 35 U.S.C. § 119 to Korean Patent Application No. 10-2015-0153343, filed on Nov. 2, 2015, the entire contents of which are hereby incorporated by reference.

BACKGROUND

The present disclosure relates to a liquid crystal photo alignment agent, and a method of manufacturing liquid crystal display using the same.

Generally, liquid crystal displays are divided into twisted nematic liquid crystal display, in-plane electric field type liquid crystal display, or vertical alignment liquid crystal display depending on properties of liquid crystal layers. In particular, in liquid crystal display, liquid crystals disposed between electrodes need to be aligned in a certain direction. As a method for aligning liquid crystal molecules in a certain direction, the rubbing method and the photo alignment method are available.

Limitations in the rubbing method such as generation of foreign substances and lack of uniformity of alignment may be relaxed using the photo alignment method. Examples of materials used in the photo alignment method include polymers containing photofunctional groups such as azobenzene, cumarine, imide, chalcone, and cinnamate. In such polymers, reactions such as photoisomerization, photocrosslinking, and photodegradation anisotropically occur due to polarized light irradiation. Through this, anisotropy is generated on the surfaces of the polymers, so that liquid crystals are aligned in one direction.

Liquid crystal photo alignment agents used in the photo alignment method should have a good coating property to substrates. Also, when the liquid crystal photo alignment agent is applied to a display, the agent should relax residual image limitation in terms of reliability.

SUMMARY

The present disclosure provides a liquid crystal photo alignment agent and a method of manufacturing a liquid crystal display using the same, wherein the liquid crystal photo alignment agent is capable of improving a coating property or printability, and residual image characteristics of a display by adjusting a composition ratio of solids and solvents used in the liquid crystal photo alignment agent.

An embodiment provides a liquid crystal photo alignment agent including: a solid including at least one of a polyimide polymer, cyclobutane dianhydride (CBDA) or diamine; a first solvent including at least one of N-methyl-2-pyrrolidone, N-ethyl-2-pyrrolidone, dimethyl sulfoxide, dimethyl formamide, γ-butyrolactone or propylene carbonate; and a second solvent including at least one of propylene glycol monobutyl ether, dipropylene glycol monomethyl ether, propylene glycol n-propyl ether, diethylene glycol diethyl ether or diacetone alcohol, wherein the first solvent is included in an amount of about 50 wt % to about 80 wt % based on the total weight of the liquid crystal photo alignment agent; and the second solvent is included in an amount of about 15 wt % to about 40 wt % based on the total weight of the liquid crystal photo alignment agent.

In an embodiment, the solid may be included in an amount of about 2 wt % to about 10 wt % based on the total weight of the liquid crystal photo alignment agent.

In an embodiment, the first solvent may be N-methyl-2-pyrrolidone and N-ethyl-2-pyrrolidone. The N-methyl-2-pyrrolidone may be included in an amount of about 40 wt % to about 70 wt % based on the total weight of the liquid crystal photo alignment agent. The N-ethyl-2-pyrrolidone may be included in an amount of about 10 wt % to about 40 wt % based on the total weight of the liquid crystal photo alignment agent In an embodiment, the second solvent may be propylene glycol monobutyl ether and dipropylene glycol monomethyl ether. The propylene glycol monobutyl ether may be included in an amount of about 10 wt % to about 30 wt % based on the total weight of the liquid crystal photo alignment agent. The dipropylene glycol monomethyl ether is included in an amount of about 5 wt % to about 20 wt % based on the total weight of the liquid crystal photo alignment agent.

In an embodiment, provided is a method of manufacturing a liquid crystal display, including: providing a first substrate including a first base substrate, a circuit layer disposed on the first base substrate, and a pixel electrode layer disposed on the circuit layer; providing a liquid crystal photo alignment agent on the pixel electrode layer to form a first preliminary alignment layer; subjecting the first preliminary alignment layer to a first heat treatment to form a first heat treated first preliminary alignment layer; and exposing the first heat treated first preliminary alignment layer to polarized ultraviolet light to form a first alignment layer. The liquid crystal photo alignment agent includes a solid including at least one of a polyimide polymer, cyclobutane dianhydride (CBDA) or diamine; a first solvent including at least one of N-methyl-2-pyrrolidone, N-ethyl-2-pyrrolidone, dimethyl sulfoxide, dimethyl formamide, γ-butyrolactone or propylene carbonate, and a second solvent including at least one of propylene glycol monobutyl ether, dipropylene glycol monomethyl ether, propylene glycol n-propyl ether, diethylene glycol diethyl ether or diacetone alcohol, wherein the first solvent is included in an amount of about 50 wt % to about 80 wt % based on the total weight of the liquid crystal photo alignment agent; and wherein the second solvent is included in an amount of about 15 wt % to about 40 wt % based on the total weight of the liquid crystal photo alignment agent.

In an embodiment, the solid may be included in an amount of about 2 wt % to about 10 wt % based on the total weight of the liquid crystal photo alignment agent.

In an embodiment, the first solvent may be N-methyl-2-pyrrolidone and N-ethyl-2-pyrrolidone, and the second solvent may be propylene glycol monobutyl ether and dipropylene glycol monomethyl ether.

In an embodiment of the method of manufacturing a liquid crystal display, the liquid crystal photo alignment agent comprises based on the total weight of the liquid crystal photo alignment agent, about 40 wt % to about 70 wt % of the N-methyl-2-pyrrolidone, about 10 wt % to about 40 wt % of the N-ethyl-2-pyrrolidone, about 10 wt % to about 30 wt % of the propylene glycol monobutyl ether, and about 5 wt % to about 20 wt % of the dipropylene glycol monomethyl ether.

In an embodiment, the method of manufacturing a liquid crystal display may further include: providing a second substrate including a second base substrate, and a color filter disposed on the second base substrate; providing the liquid crystal photo alignment agent on the color filter to form a second preliminary alignment layer; subjecting the second preliminary alignment layer to a second heat treatment to form a second heat treated second preliminary alignment layer; and exposing the second heat treated second preliminary alignment layer to polarized ultraviolet light to form a second alignment layer.

In an embodiment, providing a liquid crystal layer between the first alignment layer and the second alignment layer and coupling the first substrate and the second substrate may further be included.

In an embodiment, the providing the liquid crystal photo alignment agent includes providing the liquid crystal photo alignment agent by an inkjet printing method.

In an embodiment, the first heat treating of the liquid crystal photo alignment agent may include pre-baking the liquid crystal photo alignment agent at a first temperature; and subsequently main-baking the liquid crystal photo alignment agent at a second temperature which is higher than the first temperature.

In an embodiment, forming the first alignment layer may further include a second heat treating after exposing the first heat treated first preliminary alignment layer to polarized ultraviolet light.

BRIEF DESCRIPTION OF THE FIGURES

The accompanying drawings are included to provide a further understanding of the disclosure, and are incorporated in and constitute a part of this specification. The drawings illustrate exemplary embodiments and, together with the description, serve to explain principles of the disclosure. In the drawings:

FIG. 1, Example 1, Example 2, Example 3, Example 4, Example 5, and Example 6 are photographs showing a coating property where a liquid crystal photo alignment agent of an embodiment is used;

FIGS. 9(a), 9(b), and 9(c) and FIGS. 10(a), 10(b), and 10(c) are graphs showing surface characteristics in the case where the liquid crystal photo alignment agent of an example of an embodiment is used and in a comparative example.

DETAILED DESCRIPTION

Figure 2:
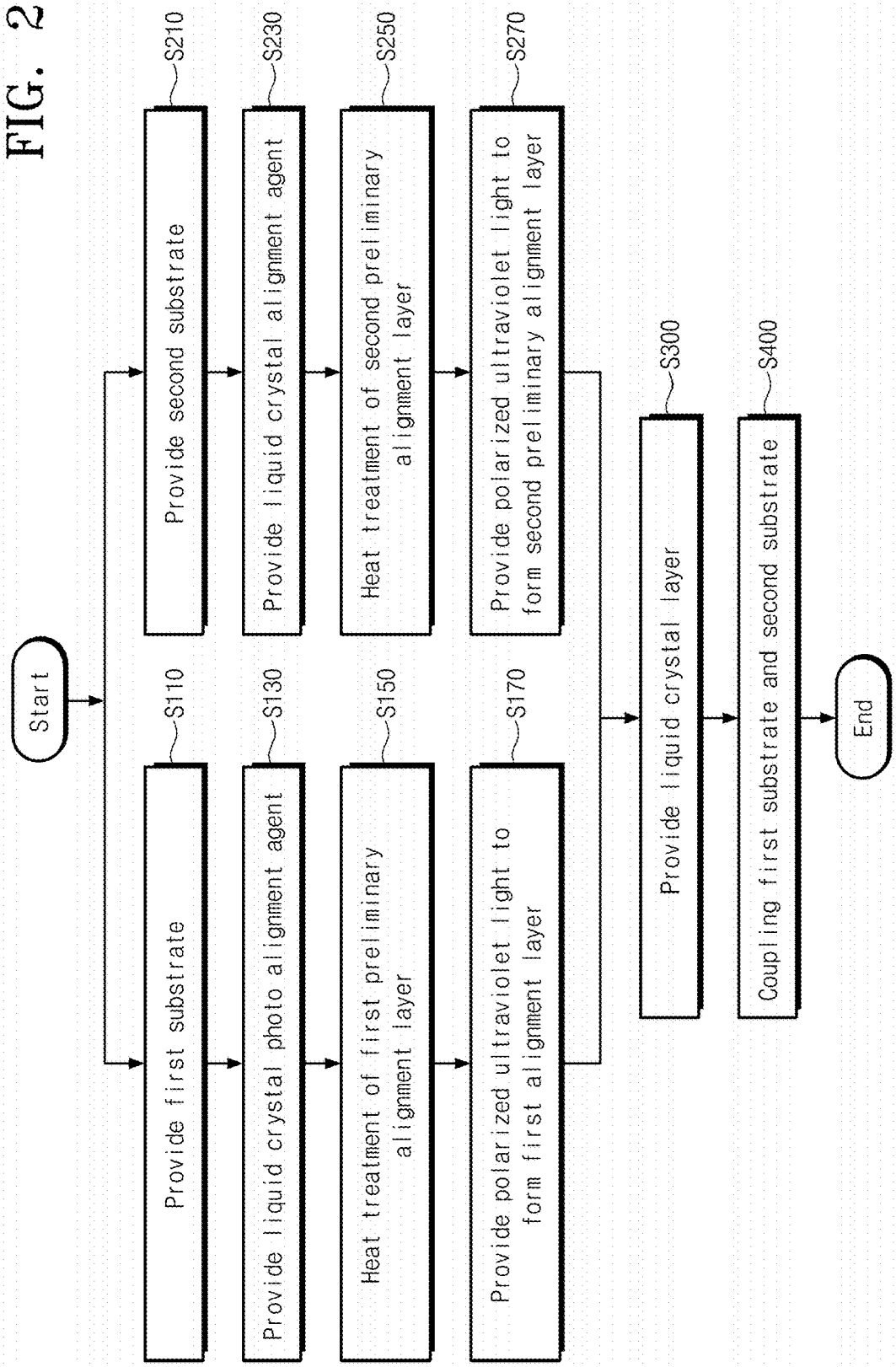
FIG. 2 is a flow chart showing a method of manufacturing a liquid crystal display of an embodiment.

Since various changes can be made, and the disclosure may be embodied in different forms, exemplary embodiments of the disclosure will be exemplified in drawings and described below in more detail. However, it will be understood that the inventive concept is not limited to particular disclosure, rather encompasses all modifications, equivalents, and substituents included in the spirit and technical scope of the inventive concept.

Like reference numerals refer to like elements throughout the description of drawings. In the accompanying drawings, the dimensions of the elements are exaggerated for clarity of the inventive concept. It will be understood that, although the terms first, second, etc. may be used herein to describe various elements, these elements should not be limited by these terms. These terms are only used to distinguish one element from another element. Thus, a first element could be termed a second element, and similarly a second element could be termed a first element without departing from the scope of the present invention. As used herein, the singular forms, "a", "an" and "the" are intended to include the plural forms as well, unless the context clearly indicates otherwise.

It will be further understood that the terms "include" and/or "have", when used in this specification, specify the presence of stated features, integers, steps, operations, elements, components, and/or mixtures thereof, but do not preclude the presence or addition of one or more other features, integers, steps, operations, elements, components, and/or mixtures thereof. Further, it will be understood that when a layer, a film, a region, or a plane is referred to as being "on" other parts, it can be "directly on" the other parts or an intervening part may be present. In contrast, when a layer, a film, a region, or a plane is referred to as being "under" other parts, it can be "directly under" the other parts or an intervening part may be present.

Spatially relative terms, such as "under", "above", "upper", and the like, may be used for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal photo alignment agent according to an embodiment will be described with reference to the drawings.

A liquid crystal photo alignment agent of an embodiment includes a solid, a first solvent including at least one of N-methyl-2-pyrrolidone (NMP), N-ethyl-2-pyrrolidone (NEP), dimethyl sulfoxide, dimethyl formamide, γ-butyrolacton or propylene carbonate, and a second solvent including at least one of propylene glycol monobutyl ether, dipropylene glycol monomethyl ether, propylene glycol n-propyl ether, diethylene glycol diethyl ether, or diacetone alcohol.

The solid may include at least one of a polyimide polymer, cyclobutane dianhydride (CBDA) or diamine. Some of the solids may be provided as a polymeric material, or be provided in a monomer or an oligomer form. For example, the solid provided in a monomer or oligomer form may form a polymer layer through a heat polymerization process. The polymer layer formed by using the solid corresponds to an alignment layer configured to align liquid crystal molecules. The polymer layer formed by using the liquid crystal photo alignment agent of an embodiment may correspond to a photo alignment layer having an alignment property by a provided light, e.g. ultraviolet light.

In an embodiment, the solid may have a photoreactive group capable of performing photoisomerization, photo-crosslinking, or photodegradation. These photoreactions may occur when the polymer layer is irradiated with a polarized ultraviolet light.

For example, in an embodiment, the solid may include CBDA and diamine. The CBDA and diamine may be photoreactive materials in which photodegradation occurs due to a polarized ultraviolet light.

The first solvent may include at least one of NMP, NEP, dimethyl sulfoxide, dimethyl formamide, γ-butyrolacton or propylene carbonate. The first solvent may correspond to solvents increasing solubility of the solid. For example, in an embodiment, the first solvent may include NMP and NEP.

The second solvent may include at least one of propylene glycol monobutyl ether, dipropylene glycol monomethyl ether, propylene glycol n-propyl ether, diethylene glycol diethyl ether, or diacetone alcohol. For example, the second solvent may be propylene glycol monobutyl ether or dipropylene glycol monomethyl ether. For example, the second solvent may be propylene glycol monobutyl ether and dipropylene glycol monomethyl ether.

In an embodiment, the first solvent may be included in an amount of about 50 wt % to about 80 wt % based on the total weight of the liquid crystal photo alignment agent, and the second solvent may be included in an amount of about 15 wt % to about 40 wt % based on the total weight of the liquid crystal photo alignment agent. When the first solvent is included in an amount less than about 50 wt %, solubility of the solid included in the liquid crystal photo alignment agent may be insufficient. When the first solvent is included in an amount more than about 80 wt %, an amount of the second solvent may relatively be insufficient, so that the coating property of the liquid crystal photo alignment agent may be reduced. The coating property of the liquid crystal photo alignment agent may be evaluated by wetting to the surface where the alignment agent is printed or observing apparent surface uniformity after coating.

When the second solvent is included in an amount at least about 15 wt %, the coating property or printability of the liquid crystal photo alignment agent may be improved, and when the second solvent is included in an amount more than about 40 wt %, an amount of the first solvent is relatively insufficient, so that solubility of the solid may be reduced.

In an embodiment, the solid may be included in an amount of about 2 wt % to about 10 wt % based on the total weight of the liquid crystal photo alignment agent. When more than about 10 wt % of the solid is included, viscosity may be increased to an unsuitable level for the printing method or inkjet coating method. Also, when less than about 2 wt % of the solid is included, the alignment layer may be of insufficient thickness.

In an embodiment, the liquid crystal photo alignment agent may include NMP and NEP, as a first solvent, and propylene glycol monobutyl ether and dipropylene glycol monomethyl ether as a second solvent. In this case, NMP may be included in an amount of about 40 wt % to about 70 wt %, and NEP may be included in an amount of about 10 wt % to about 40 wt %.

When less than about 40 wt % of NMP is included, solubility of the solid may be reduced. Meanwhile, when NMP is used together with NEP, as a first solvent, a characteristic of the photo alignment layer may be improved, while increasing solubility of the solid.

For example, mobility of the solid may be improved by using at least about 10 wt % of NEP. However, since NEP has a relatively higher surface tension than NMP, when more than about 40 wt % of NEP is included, wetting is reduced during the coating of the liquid crystal photo alignment agent.

Further, as a second solvent, propylene glycol monobutyl ether may be included in an amount of about 10 wt % to about 30 wt % based on the total weight of the liquid crystal photo alignment agent and dipropylene glycol monomethyl ether may be included in an amount of about 5 wt % to about 20 wt % based on the total weight of the liquid crystal photo alignment agent. When less than about 10 wt % of propylene glycol monobutyl ether is included, wetting may be reduced during the coating of the liquid crystal photo alignment agent. Also, when more than about 30 wt % of propylene glycol monobutyl ether is included, a ratio of the first solvent in a composition of the liquid crystal photo alignment agent is relatively decreased, so that solubility of the solid may be reduced.

Also, when less than about 5 wt % of dipropylene glycol monomethyl ether is included, wetting may be reduced during the coating of the liquid crystal photo alignment agent, and when more than about 20 wt % of dipropylene glycol monomethyl ether is included, a ratio of the first solvent is relatively decreased, so that solubility of the solid may be reduced.

FIG. 1 shows surface states when a liquid crystal photo alignment agents is provided. FIG. 1 shows appearance characteristics when surfaces are coated with the liquid crystal photo alignment agent of an embodiment. In FIG. 1, uniform surface appearances, which indicate high wetting, may be determined to have a good coating property. Table 1 below shows composition ratios of liquid crystal photo alignment agents of respective examples exhibiting surface characteristics in FIG. 1.

TABLE 1

| | Composition ratio of liquid crystal photo alignment agent (wt %) | | | | |
|---|---|---|---|---|---|
| | Solid | NMP | NEP | PB | DPM |
| Example 1 | 2.3 | 67.8 | — | 20 | 10 |
| Example 2 | 2.3 | 47.8 | 20 | 20 | 10 |
| Example 3 | 2.3 | 47.8 | 20 | 20 | 30 |
| Example 4 | 2.3 | 47.8 | 20 | — | 30 |
| Example 5 | 2.3 | 27.8 | 40 | 20 | 10 |
| Example 6 | 2.3 | 67.8 | 20 | — | 10 |

In examples provided in Table 1, the solid includes CBDA and diamine; NMP and NEP are used as a first solvent; and propylene glycol monobutyl ether (PB) and dipropylene glycol monomethyl ether (DPM) are used as a second solvent.

Referring to the drawings, except Examples 4 and 6, remaining Examples show a good coating property. Accordingly, when the liquid crystal photo alignment agents of Examples 1-3 and 5 are coated, wetting of the liquid crystal photo alignment agents to surfaces where the liquid crystal photo alignment agents are provided is good, thereby showing uniform coating property to the surfaces.

Meanwhile, when comparing Example 4 with Example 6, Example 4 shows a better coating property than Example 6. Namely, in Examples of the liquid crystal photo alignment agents, when the content of included PB and DPM, i.e. a second solvent, is more than about 10 wt %, the wetting of the liquid crystal photo alignment agent is improved.

In addition, when comparing Example 3 with Example 4, to improve the wetting during the coating, it is more effective to include PB as a second solvent.

In order words, the coating property of the liquid crystal photo alignment agent is good, when the first solvent is included in an amount of about 50 wt % to about 80 wt % based on the total weight of the liquid crystal photo alignment agent, and the second solvent is included in an amount of about 15 wt % to about 40 wt % based on the total weight of the liquid crystal photo alignment agent.

Hereinafter is described a method of manufacturing a liquid crystal display using the liquid crystal photo alignment agent of an embodiment described above. In the method of manufacturing a liquid crystal display, description of the above-mentioned liquid crystal photo alignment agent is not provided again, but rather steps of manufacturing a liquid crystal display will be described in more detail.

FIG. 2 is a flow chart showing an embodiment of a method of manufacturing a liquid crystal display. The method of manufacturing a liquid crystal display may include: providing a first substrate (S110); providing a liquid crystal photo alignment agent to allow a first preliminary alignment layer to be formed (S130); heat-treating the first preliminary alignment layer (S150); and providing a polarized ultraviolet light and forming a first alignment layer (S170).

In addition, the method of manufacturing a liquid crystal display may further include: providing a second substrate (S210); providing the liquid crystal photo alignment agent to allow a second preliminary alignment layer to be formed (S230); heat-treating the second preliminary alignment layer (S250); and irradiating a polarized ultraviolet light and forming a second alignment layer (S270).

In the flow chart shown in FIG. 2, processes of forming the first alignment layer on the first substrate (S110 to S170) and processes of forming the second alignment layer on the second substrate (S210 to S270) are shown in parallel, but an embodiment is not limited thereto. For example, processes of forming the first alignment layer on the first substrate (S110 to S170) and processes of forming the second alignment layer on the second substrate (S210 to S270) may be independently conducted, but may be simultaneously conducted. Alternatively, processes of forming the first alignment layer on the first substrate (S110 to S170) may be conducted, and then processes of forming the second alignment layer on the second substrate (S210 to S270) may be sequentially conducted.

The method of manufacturing a liquid crystal display may further include: after the forming the first and second alignment layers, providing a liquid crystal layer between the first alignment layer and the second alignment layer (S300); and coupling the first substrate and the second substrate (S400). As used herein, "coupling" of the first substrate and the second substrate includes forming an article by disposing one of the substrates on the other substrate, optionally including one or more intervening layers or elements interposed between the first substrate and the second substrate. The substrates can be adhered or physically stacked.

In the flow chart shown in FIG. 2, it is indicated that the providing the liquid crystal layer (S300) is conducted, and then the coupling the first substrate and the second substrate (S400) is sequentially conducted, however an embodiment is not limited thereto. For example, an assembly process for coupling the first substrate and the second substrate may be conducted, and then the liquid crystal layer may be provided.

In providing the first substrate (S110), the first substrate may include a base substrate, a circuit layer provided on the first substrate and a pixel electrode layer. On the first substrate, a liquid crystal photo alignment agent may be provided to form the first preliminary alignment layer. The liquid crystal photo alignment agent corresponds to the liquid crystal photo alignment agent of an embodiment described above.

The liquid crystal photo alignment agent may be provided on the first substrate with various coating methods. For example, in the method of manufacturing a liquid crystal display of an embodiment, the inkjet printing method may be used. For the liquid crystal photo alignment agent of an embodiment, a composition ratio between the first solvent and the second solvent is optimized and the liquid crystal alignment agent is provided on the substrate by using the inkjet printing method, thereby achieving a good coating property. In an embodiment, providing the liquid crystal photo alignment agent includes providing the liquid crystal photo alignment agent by an inkjet printing method.

However, an embodiment is not limited thereto. The liquid crystal photo alignment agent may be provided by the flexographic printing method. When the liquid crystal photo alignment agent is coated by using the flexographic printing method, it is possible to achieve a good coating property.

The liquid crystal photo alignment agent provided by various coating methods may form the first preliminary alignment layer. In this case, the preliminary alignment layer indicates an alignment layer before heat treatment or ultraviolet ray irradiation. In other word, the preliminary alignment layer indicates a film layer coated on the substrate or indicates an alignment layer before anisotropy is generated due to ultraviolet ray irradiation.

The first preliminary alignment layer formed by using the provided liquid crystal photo alignment agent is subjected to a first heat treating process (S150). The first heat treating process (S150) may correspond to the steps of volatilizing the solvent in the liquid crystal photo alignment agent provided in a liquid phase, and polymerizing the solid to form a film having a certain thickness.

In this case, the first heat treating process may include a pre-baking process, in which heat at a first temperature is provided, and a main-baking process in which heat at a second temperature higher than the first temperature is provided.

The first temperature for the pre-bake process may be about 60° C. to about 100° C., and the pre-baking is continued for about 60 seconds to about 100 seconds. During the pre-baking process, solvent components included in the liquid crystal photo alignment agent may be volatilized. In addition, during the pre-baking process, mobility of the solvent is improved, so that the solid included in the liquid crystal photo alignment agent may be moved and aligned. In this case, components having a photoreactive group among the solids may be relatively aligned on the surface of the alignment layer.

The second temperature at which the main-baking process is conducted may be about 200° C. to about 250° C., and the main-baking is continued for about 10 minutes to about 30 minutes. In the main-baking process, some of the solids included in the liquid crystal photo alignment agent may form a polymer layer through heat-polymerization or heat-curing reaction.

After the first heat treating, the method includes irradiating the first preliminary alignment layer with polarized ultraviolet light and forming the first alignment layer (S170). The wavelength of the polarized ultraviolet light may have a range of about 240 nm to about 380 nm. The first preliminary alignment layer, which is formed thorough heat-curing in the first heat-treating process, may have anisotropy by irradiation with a polarized ultraviolet light. In this case, anisotropy of the alignment layer may be determined depending on the polarization directions of the ultraviolet light. For example, the alignment layer may be formed to have a main alignment direction which is perpendicular to the polarization direction of the provided ultraviolet light (i.e., light absorbing axis direction).

Although not shown in drawings, the method of manufacturing a liquid crystal display of an embodiment may further include providing a second heat treating after the irradiating with a polarized ultraviolet light. The second heat treating may be continued for about 10 minutes to about 30 minutes at about 200° C. to about 250° C. During the second heat treating, polymeric materials in the alignment layer having an alignment direction may be reoriented. Accordingly, by further including the second heat treating in the method of manufacturing a liquid crystal display, the alignment property of the alignment layer may be more increased.

Meanwhile, processes for forming the second alignment layer on the second substrate (S210 to S270) may include the same method as the processes for forming the first alignment layer described above. However, the second substrate may include a second base substrate and a color filter disposed on the second base substrate.

The liquid crystal photo alignment agent of an embodiment described above is provided on the second substrate on which the color filter is provided. Then, the second alignment layer is formed through the first heat treating and polarized ultraviolet light irradiating.

After the first and second alignment layers are formed, a liquid crystal layer may be provided between the first alignment layer and the second alignment layer. In this case, the liquid crystal layer may be provided through the liquid crystal dropping method or the liquid crystal injection method. However, an embodiment is not limited thereto, and any method for providing liquid crystal molecules to the space between the first alignment layer and the second alignment layer is available without restriction as a method for providing a liquid crystal layer.

The first substrate and the second substrate, where the liquid crystal layer is provided, may be coupled through an assembly process. However, an embodiment is not limited thereto, and the assembly process of the first substrate and the second substrate may be conducted simultaneously with or prior to the providing of the liquid crystal layer.

In the method of manufacturing a liquid crystal display of an embodiment, by using the liquid crystal photo alignment agent having the optimized solvent composition ratio of an embodiment as described above, the coating property of the liquid crystal photo alignment agent to the substrate may be improved. In addition, by increasing a ratio in which components having a photoreactive group among the solids in the liquid crystal photo alignment agent are aligned on the surface of the alignment layer, the alignment characteristics of the liquid crystal molecules may be improved in the display. In addition, by improving the alignment property of liquid crystal molecules, the liquid crystal molecules are prevented from being dislocated from the initial alignment state, when the liquid crystal molecules return to the Off state after application of an electrical field, so that the residual image problem of the display may be alleviated.

Figure 3:
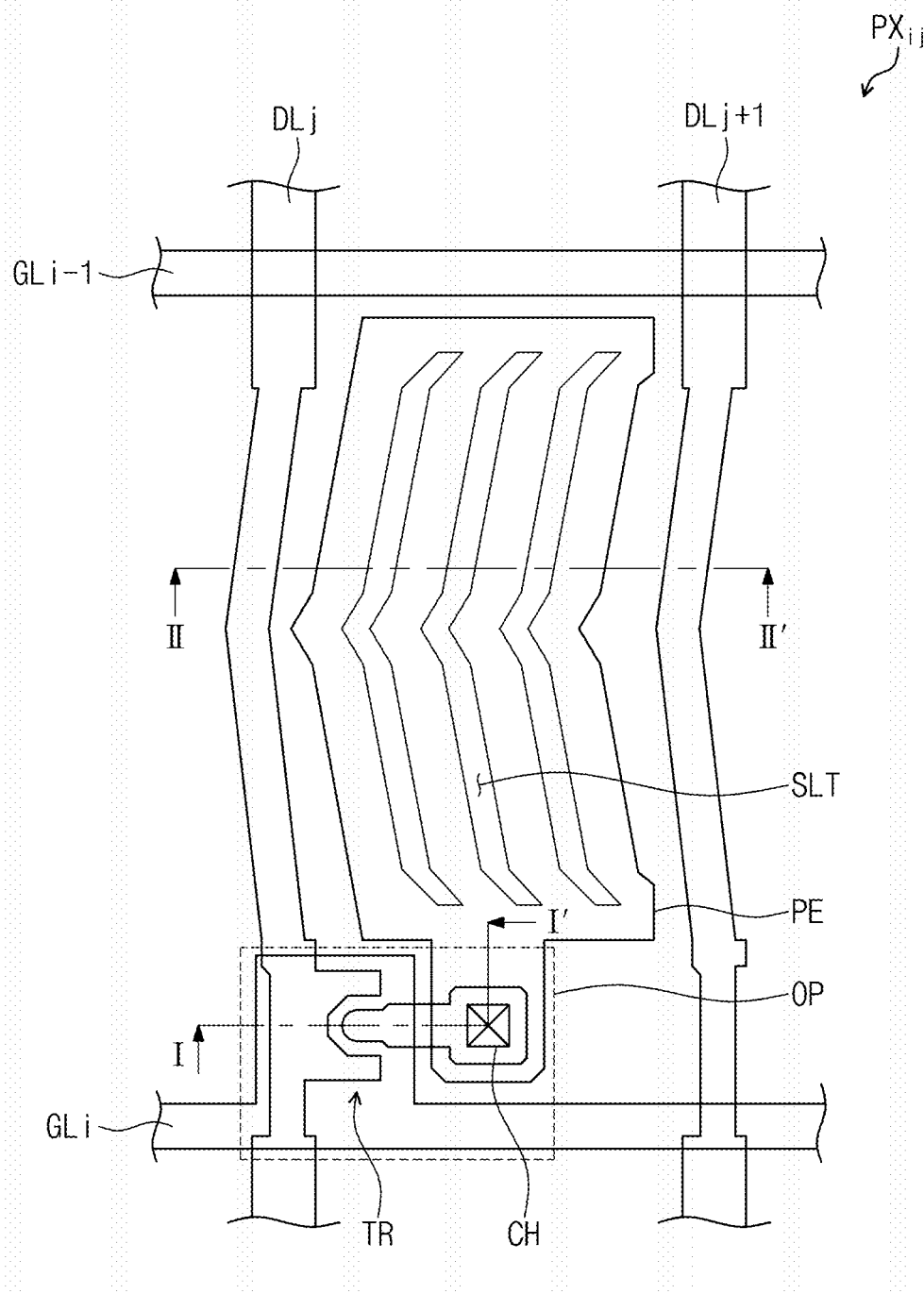
FIG. 3 is a layout of a pixel of the liquid crystal display provided by an embodiment of the method of manufacturing a liquid crystal display.
Figure 4:
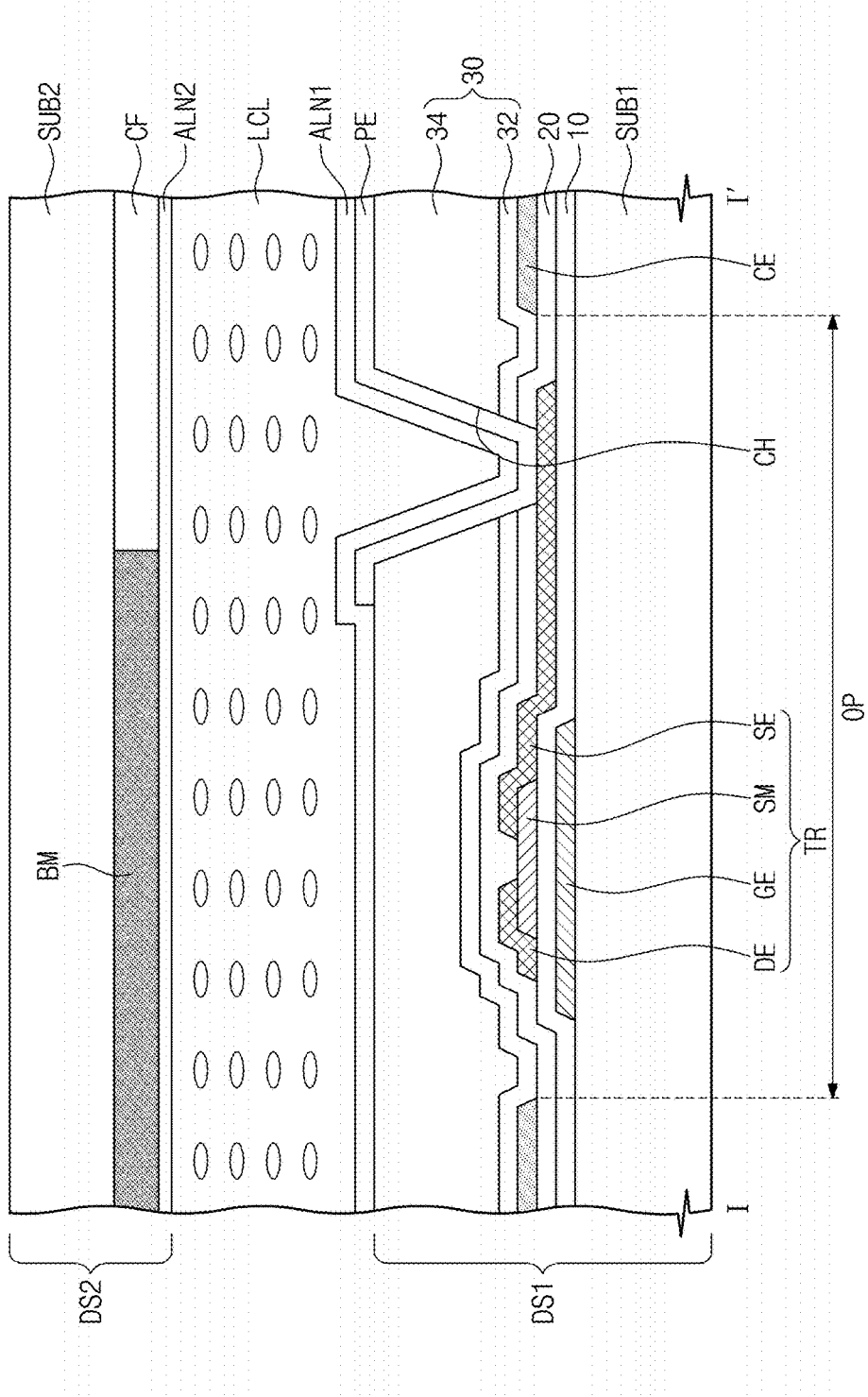
FIG. 4 is a cross sectional view of a display panel taken along I-I' in FIG. 3.
Figure 5:
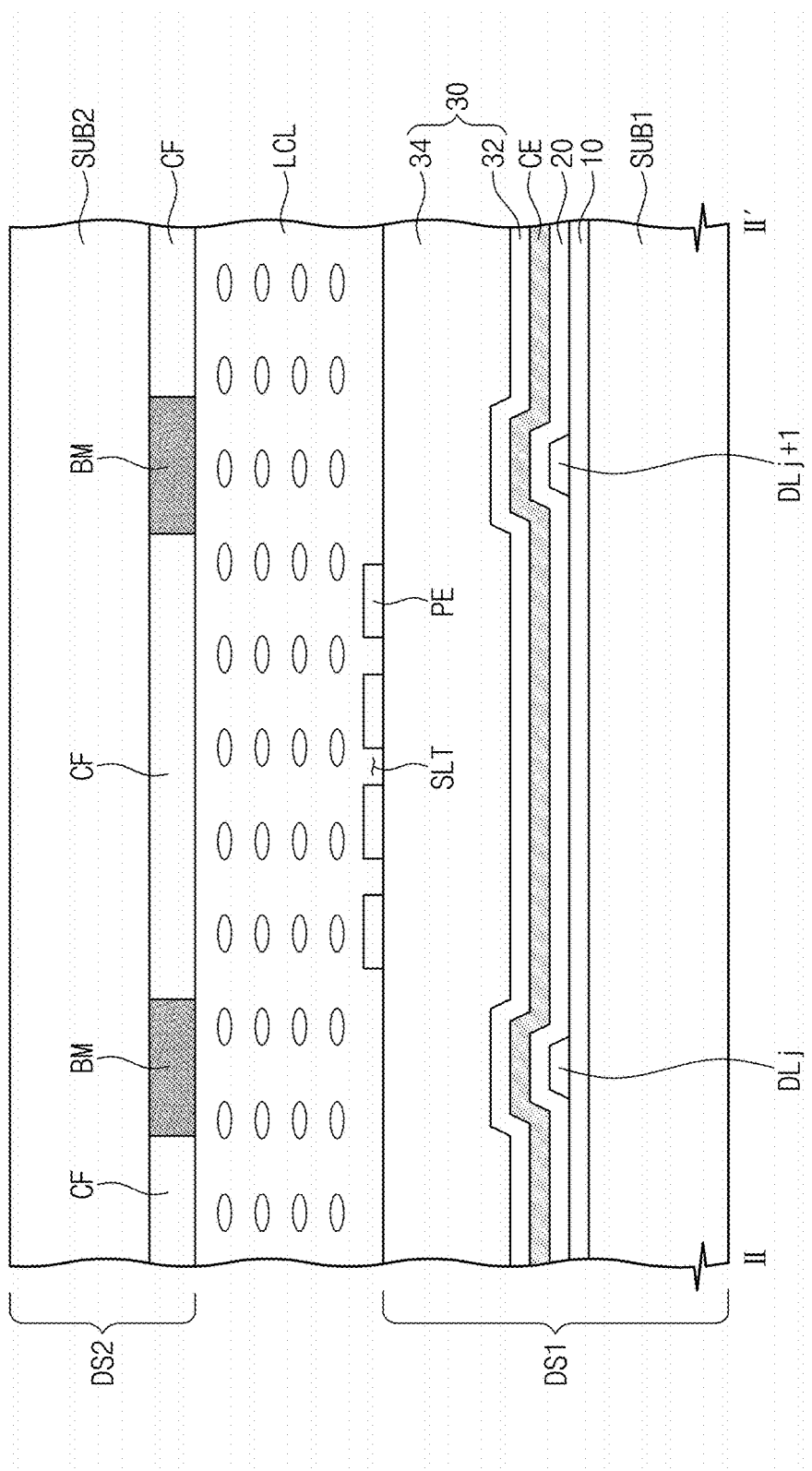
FIG. 5 is a cross sectional view of a display panel taken along II-II' in FIG. 3.

FIG. 3 shows a layout of a pixel included in the liquid crystal display provided by the method of manufacturing a liquid crystal display of an embodiment. FIGS. 4 and 5 show cross sectional views of a display panel. FIG. 4 is a cross sectional view showing a section taken along I-I' in FIG. 3. FIG. 5 is a cross sectional view showing a section taken along II-II' in FIG. 3.

The liquid crystal display provided by the method of manufacturing a liquid crystal display of an embodiment may include a pixel in a plane to line switching (PLS) mode. However, an embodiment is not limited thereto, and the liquid crystal photo alignment agent of an embodiment may be used in a display in an in-plane alignment mode or a display in a vertical alignment mode, which are not shown in drawings.

Referring to the drawings in FIGS. 3 to 5, a pixel ($PX_{ij}$) may include a thin-film transistor TR, a pixel electrode PE coupled to the thin-film transistor TR, a common electrode CE overlapping with the pixel electrode PE and including an opening OP. Although not shown in FIG. 3, the common electrode CE may overlap with a plurality of pixels and is formed on a front face of a display area of the display.

The thin-film transistor TR may include a control electrode GE, a semiconductor pattern SM, an output electrode SE and an input electrode DE. The output electrode SE may be coupled to the pixel electrode PE via a contact hole CH. On the pixel electrode PE, a plurality of slits SLTs may be defined. The number and shape of the slits SLTs may be varied, and not limited to embodiment shown in FIG. 3. In addition, the control electrode GE may be coupled to a $i^{th}$ gate line GLi, and the input electrode DE may be coupled to a $j^{th}$ data line DLj.

Referring to the drawings in FIGS. 4 and 5, a first substrate DS1 may include a first base substrate SUB1, a circuit layer disposed on the first base substrate SUB1 and including a thin-film transistor TR, and a pixel electrode layer PE. The first base substrate SUB1 may also include a plurality of insulating layers 10, 20, 30 disposed on the first base substrate SUB1.

The first base substrate SUB1, which is a transparent substrate, may be a plastic substrate or a glass substrate. The control electrode GE is disposed on one face of the first base substrate SUB1. Although not shown in the drawings, on one face of the first base substrate SUB1, a barrier layer and/or buffer layer may further be disposed. The control electrode GE may be disposed on the barrier layer and/or buffer layer.

On the first base substrate SUB1, a first insulating layer 10 is disposed to cover the control electrode GE. The first insulating layer 10 may include at least one of a silicon nitride layer or a silicon oxide layer. On the first insulating layer 10, a semiconductor layer SM may be disposed, and the first insulating layer 10 may include an ohmic contact layer (not shown) disposed on the semiconductor layer. On the first insulating layer 10, the input electrode DE and the output electrode SE may be disposed.

On the first insulating layer 10, a second insulating layer 20 may be disposed to cover the input electrode DE and the output electrode SE. The second insulating layer 20 may include at least one of a silicon nitride layer or a silicon oxide layer.

On the second insulating layer 20, the common electrode CE may be disposed. The common electrode may be provided on the front face of the base substrate SUB1 in a planar shape. In addition, in the common electrode CE, the opening OP may be defined to prevent short of the pixel electrode PE and common electrode CE described below.

On the second insulating layer 20, a third insulating layer 30 may be disposed to cover the common electrode CE. The third insulating layer 30 may include an inorganic layer 32 and an organic layer 34 providing a flat surface. The inorganic layer 32 may include at least one of a silicon nitride layer or a silicon oxide layer.

On the third insulating layer 30, the pixel electrode PE may be disposed. The pixel electrode PE and the output electrode SE may be coupled via a contact hole CH communicating the second insulating layer 20 and the third insulating layer 30. The pixel electrode PE may include, for example, a transparent metal oxide. The pixel electrode PE and the common electrode CE may form an in-plane electric field.

A first alignment layer ALN1 may be provided on the pixel electrode PE and the third insulating layer 30. The first alignment layer ALN1 may be formed by using the liquid crystal photo alignment agent of an embodiment described above.

The second substrate DS2 may include a second base substrate SUB2, a color filter CF disposed on the second base substrate SUB2. The second substrate DS2 may include a black matrix BM disposed between the color filters CFs. The second base substrate SUB2 may be formed by using the same material as the first base substrate SUB1 described above. The color filter CF provided on the second base substrate SUB2 may overlap with the pixel electrode PE, and the black matrix BM may overlap with the thin-film transistor TR. However, an embodiment is not limited thereto, and at least one of the color filter CF or the black matrix BM may be disposed on the first base substrate SUB1.

On the color filter CF and the black matrix BM, an overcoating layer, which is an organic insulating layer (not shown), may be provided. The organic insulating layer (not shown) may prevent exposure of the color filter CF and provide a flat surface on the second substrate DS2. On the color filter CF and the black matrix BM, a second alignment layer ALN2 may be disposed. The second alignment layer ALN2 may be formed by using the liquid crystal photo alignment agent of an embodiment described above.

A liquid crystal layer LCL may be provided between the first alignment layer ALN1 and the second alignment layer ALN2. The liquid crystal layer LCL may include a liquid crystal material having positive dielectric anisotropy, and the liquid crystal molecules included in the liquid crystal layer may be arranged such that a major axis is in parallel to the first substrate DS1 and the second substrate DS2.

An initial alignment direction of liquid crystal molecules may be determined by a polarization direction of the polarized ultraviolet light used to irradiate the liquid crystal photo alignment agent. For example, anisotropy of the alignment layer is induced by the irradiation with polarized ultraviolet light, and thus liquid crystal molecules are mainly aligned in a certain direction.

In this case, by using the liquid crystal photo alignment agent of an embodiment, the alignment property for aligning liquid crystal molecules in a certain direction may be improved. Further, by using the liquid crystal photo alignment agent of an embodiment as a material for an alignment layer, return of the liquid crystal to the initial alignment state may be facilitated at the Off state of an electric field, so that residual image problem may be alleviated.

Hereinafter, with reference to embodiments and comparative embodiments, results will be described in detail evaluating a liquid crystal display which is manufactured according to the method of manufacturing a liquid crystal display of an embodiment by using the liquid crystal photo alignment agent of an embodiment. Further, embodiments set forth hereinafter are examples, and embodiments of the liquid crystal display manufactured by an embodiment are not limited to the embodiments set forth hereinafter Table 2 below shows results of evaluating properties of alignment layers of Comparative Examples and Examples. Properties of photo alignment layers using a liquid crystal photo alignment agent of an embodiment were compared by using "Δangle" to evaluate the residual image characteristic in the case in which the films were applied to displays and "phase separation (%)" which is capable of evaluating chemical properties of the surface of the alignment layer.

TABLE 2

| | Composition ratio of liquid crystal photo alignment agent (wt %) | | | | | | Δangle (°) | Phase separation (%) |
|---|---|---|---|---|---|---|---|---|
| | Solid | NMP | NEP | BCS | PB | DPM | | |
| Comparative Example 1 | 5.5 | 74.5 | — | 20 | — | — | 0.36 | 70 |
| Comparative Example 2 | 2.3 | 77.7 | — | 20 | — | — | 0.30 | 73 |
| Example 1 | 2.3 | 67.7 | — | — | 20 | 10 | 0.27 | 75 |
| Example 2 | 2.3 | 47.7 | 20 | — | 20 | 10 | 0.22 | 81 |

Composition of Liquid Crystal Photo Alignment Agent

In Table 2, the solids used in the Comparative Examples and Examples are the same. Composition numbers for each component are given as weight % based on the total weight of the liquid crystal photo alignment agent. Comparative Example 1 differs from Comparative Example 2 in terms of the relative amount of the solid, and the same solvent is used. The solids used in Comparative Examples 1 and 2, and Example 1 and 2 are cyclobutane dianhydride (CBDA) and diamine. In Comparative Example 1, about 5.5 wt % of solid was used, and in Comparative Example 2, less solid was included relative to Comparative Example 1. In Examples 1 and 2, as well as Comparative Example 1, liquid crystal photo alignment agents included about 2.3 wt % of solid.

In addition, in Comparative Examples 1 and 2, N-methyl-2-pyrrolidone (NMP) and butyl cellosolve (BCS) were used as a solvent, and in Example 1, NMP was used as a first solvent, and propylene glycol monobutyl ether (PB) and dipropylene glycol monomethyl ether (DPM) were used as a second solvent. In Example 2, N-ethyl-2-pyrrolidone (NEP) was additionally included as a first solvent, when compared with Example 1.

Solvents used in Example and Comparative Example in Table 2 are shown in Formulae 1 and 2 below. Formula 1 shows NMP and BCS used in Comparative Example in sequence. Formula 1 shows NMP, NEP, PB, and DPM used in Example in sequence.

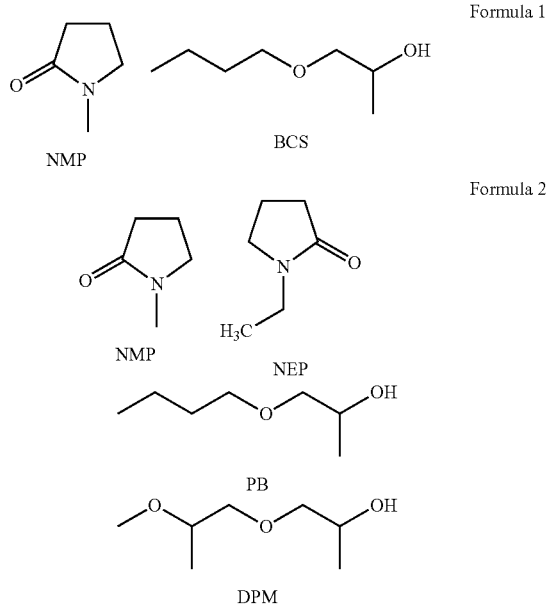

Manufacture of Liquid Crystal Display

To evaluate properties of the alignment layer formed by employing the liquid crystal photo alignment agent, liquid crystal displays were manufactured by using liquid crystal photo alignment agents having the composition ratios of Comparative Examples and Examples shown in Table 2. As a method of manufacturing a liquid crystal display, the method of manufacturing a liquid crystal display of an embodiment described above was used.

To describe a process of forming an alignment layer in detail, for manufacture of samples of Comparative Examples and Examples, liquid crystal photo alignment agents having composition ratios of Comparative Examples and Examples were coated, through the inkjet printing method, on substrates where electrodes were formed. Then, a first heat treatment was performed. As a first heat treatment, pre-bake was performed at about 80° C. for about 80 seconds followed by main-bake at about 230° C. for about 20 minutes. After the first heat treatment, the preliminary alignment layer thus formed was irradiated with polarized ultraviolet light. The ultraviolet light had an intensity of about 0.5 J/cm$^2$. Then, heat treatment was performed at about 230° C. for about 30 minutes to form a photo alignment layer. The thickness of the formed photo alignment layer was measured as about 100 nm.

Hardness Evaluation of Alignment Layer

Hardness of alignment layers of Comparative Examples and Examples manufactured by the manufacturing method as described above was evaluated. Hardness of films was compared through the rubbing method in alignment layers formed by using the same method.

A rubbing roll, which rotates at about 1000 rpm, was moved at about 20 mm/sec to perform rubbing, and then surface states of alignment layers were compared. A similar degree of surface state was shown in the case where the liquid crystal photo alignment agents of Comparative Examples and Examples were used. Consequently, hardness of the alignment layers formed by using the liquid crystal photo alignment agents of the Examples is equivalent to that of Comparative Examples.

Evaluation of Residual Image Characteristic

Figure 6:
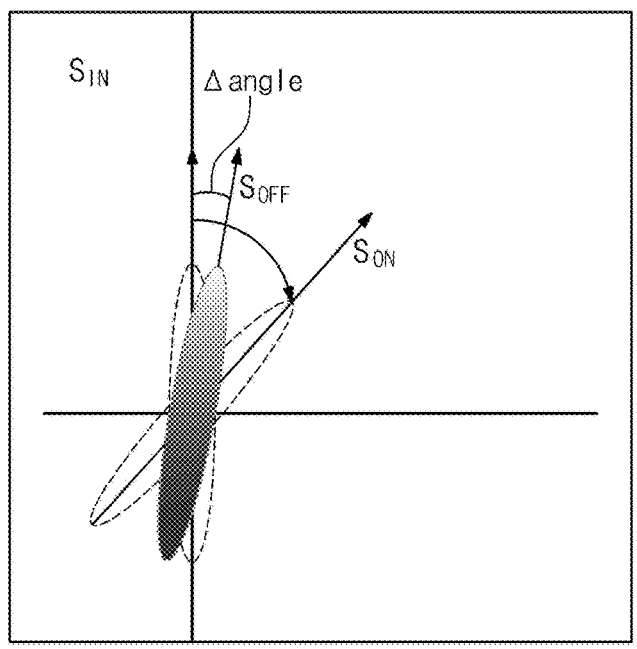
FIG. 6 schematically shows a method of evaluating the residual image characteristic.

The value "Δangle" is a standard of evaluating the residual image characteristic in displays. FIG. 6 briefly shows a method of evaluating "Δangle". Referring to the drawing in FIG. 6, it has been assumed that: $S_{IN}$ indicates an initial alignment state of a liquid crystal without application of an electric field; $S_{ON}$ indicates an alignment state of a liquid crystal under the On condition in which an electric field is applied; $S_{OFF}$ indicates a final alignment state of a liquid crystal returning, from the On condition, to the Off condition without application of an electric field; and "Δangle" indicates an angle between the $S_{IN}$ and $S_{OFF}$. Accordingly, it is considered that a large Δangle value indicates that the liquid crystal hardly returns to the initial alignment state under the Off condition, so that a large Δangle value leads to a great probability of residual image generation.

To evaluate residual image characteristics when the liquid crystal photo alignment agents of Comparative Examples and Examples were used, Δangle values were measured in displays manufactured including the liquid crystal photo alignment agents of Comparative Examples and Examples.

When comparing Δangle values in Table 2, Δangle values were reduced when the liquid crystal photo alignment agent compositions of Examples 1 and 2, rather than Comparative Examples were used. In other words, when the display was manufactured by using the liquid crystal photo alignment agent of an embodiment, an effect of improving the residual image characteristics may be achieved. In particular, compared to Example 1, since Example 2, which further includes NEP as a first solvent, shows a more decreased Δangle value than Example 1, it would be found that using NMP together with NEP as a first solvent is more effective in improvement of the residual image characteristic.

Figure 7:
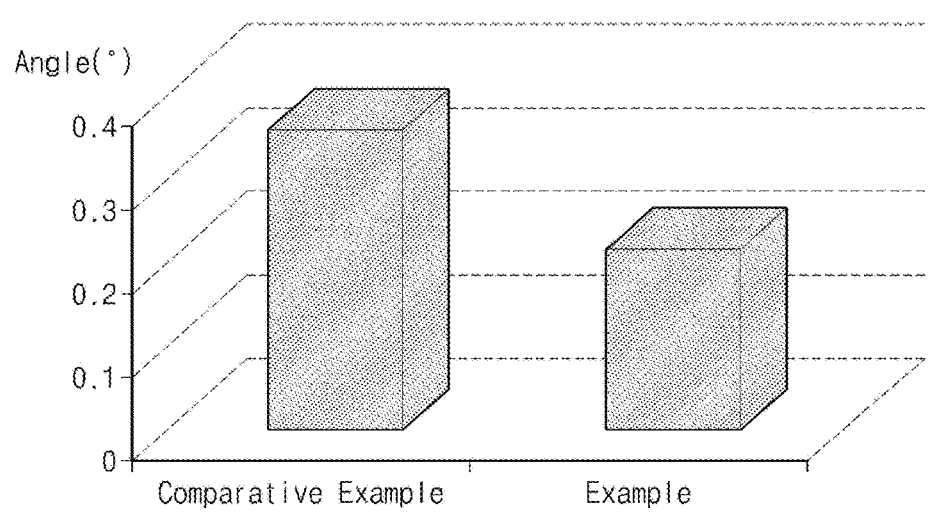
FIG. 7 is a graph showing residual image characteristics in the case where the liquid crystal photo alignment agent of an example of an embodiment is used and in a comparative example.

FIG. 7 is a graph comparing Δangle values of Comparative Example 1 and Example 2 in Table 2. Further, FIG. 8 is a graph comparing Δangle values according to pre-bake temperature and showing Δangle values of Comparative Example 1 and Example 2 in Table 2.

Referring to FIG. 7, when an alignment layer was formed by using the liquid crystal photo alignment agent of an embodiment, the residual image characteristic was improved, when compared to the Comparative Example in which a typical solvent composition was used.

Figure 8:
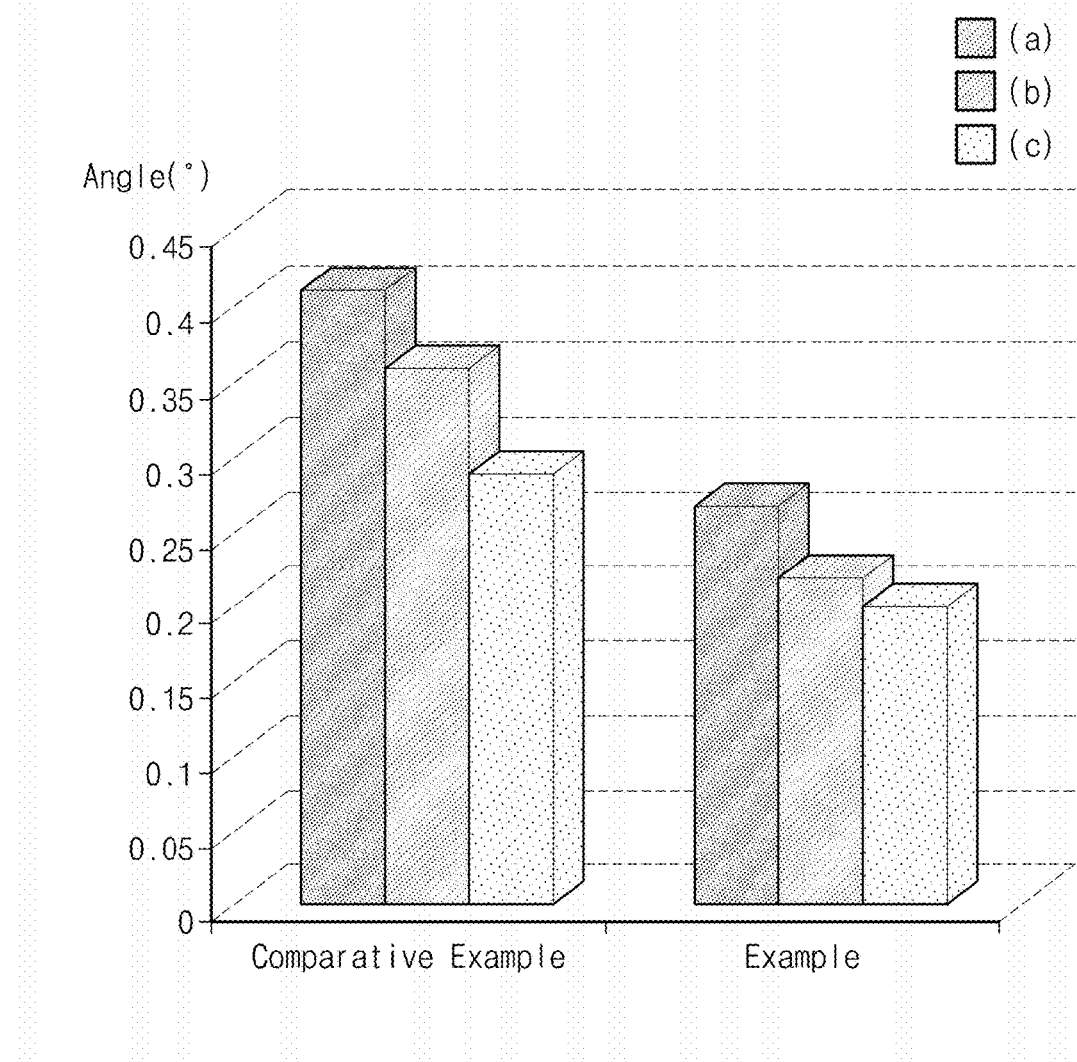
FIG. 8 is a graph showing residual image characteristics depending on pre-bake temperatures in the case where the liquid crystal photo alignment agent of an example of an embodiment is used and in comparative example.

In FIG. 8, (a) indicates a Δangle value at pre-bake temperature of about 60° C.; (b) indicates a Δangle value at pre-bake temperature of about 80° C.; and (c) indicates a Δangle value at pre-bake temperature of about 100° C. Referring to the graph in FIG. 8, Δangle values tend to decrease, as pre-bake temperature increases. The reason is that, as pre-bake temperature becomes higher, mobility of solid dispersed in a solvent increases, so that a polymer having a photo functional group may be easily transported to a surface of an alignment layer, thereby improving the alignment characteristic of the photo alignment layer.

In addition, when comparing Comparative Examples and Examples, the Δangle value of an Example is lower at all pre-bake temperature conditions. Consequently, it would be found that the alignment characteristic of the alignment layer, which allows the liquid crystal to return to the initial state, may be improved, when the liquid crystal photo alignment agent having the optimized solvent composition of an embodiment is used. Additionally, it can be demonstrated that, by forming an alignment layer by using the liquid crystal photo alignment agent of an embodiment, an effect of improving the residual image characteristic may be achieved.

Evaluation of Surface Characteristic of Alignment Layer

Further, "phase separation (%)", which is expressed as a property value in Table 2, indicates a ratio of materials, which have a photoreactive group and are aligned on a surface of an alignment layer, among the solids included in the liquid crystal photo alignment agent. For example, the substrate was coated with the liquid crystal photo alignment agent, and then subjected to a pre-bake process, which is a heat treatment process, so that components having a photoreactive group among the mixed solids were phase-separated and then disposed on the surface of the alignment layer. As the ratio of disposing components having a photoreactive group on the surface increases, an alignment layer formation may be facilitated through a photo alignment process by exposure to ultraviolet rays.

In Table 2, higher "phase separation (%)" is shown in Examples compared to that of Comparative Examples. Consequently, a ratio of exposing solids having a photoreactive group to the surface is increased. In addition, a photo alignment reaction may be easily conducted as a large amount of solids having a photoreactive group are disposed on the upper layer of the alignment layer.

In particular, Example 2, which additionally includes NEP, as a first solvent, compared to Example 1, shows a significantly increased ratio of phase separation. Also, a ratio of phase separation in Example 2 is higher than the Example 1. The reason is that NEP included in Example 2 has a lower surface tension and a higher boiling point than NMP, enabling easier transportation of the solid.

In other words, comparing to Example 1, by reducing the content of NMP and increasing the content of NEP in example 2, phase separation between components having a photoreactive group and remaining solids may be facilitated, thereby enabling a large amount of solid components having a photoreactive group to be disposed on the surface of the alignment layer. Thus, for Example 2, the alignment characteristic of the liquid crystal is more improved in the liquid crystal display.

Figure 10:
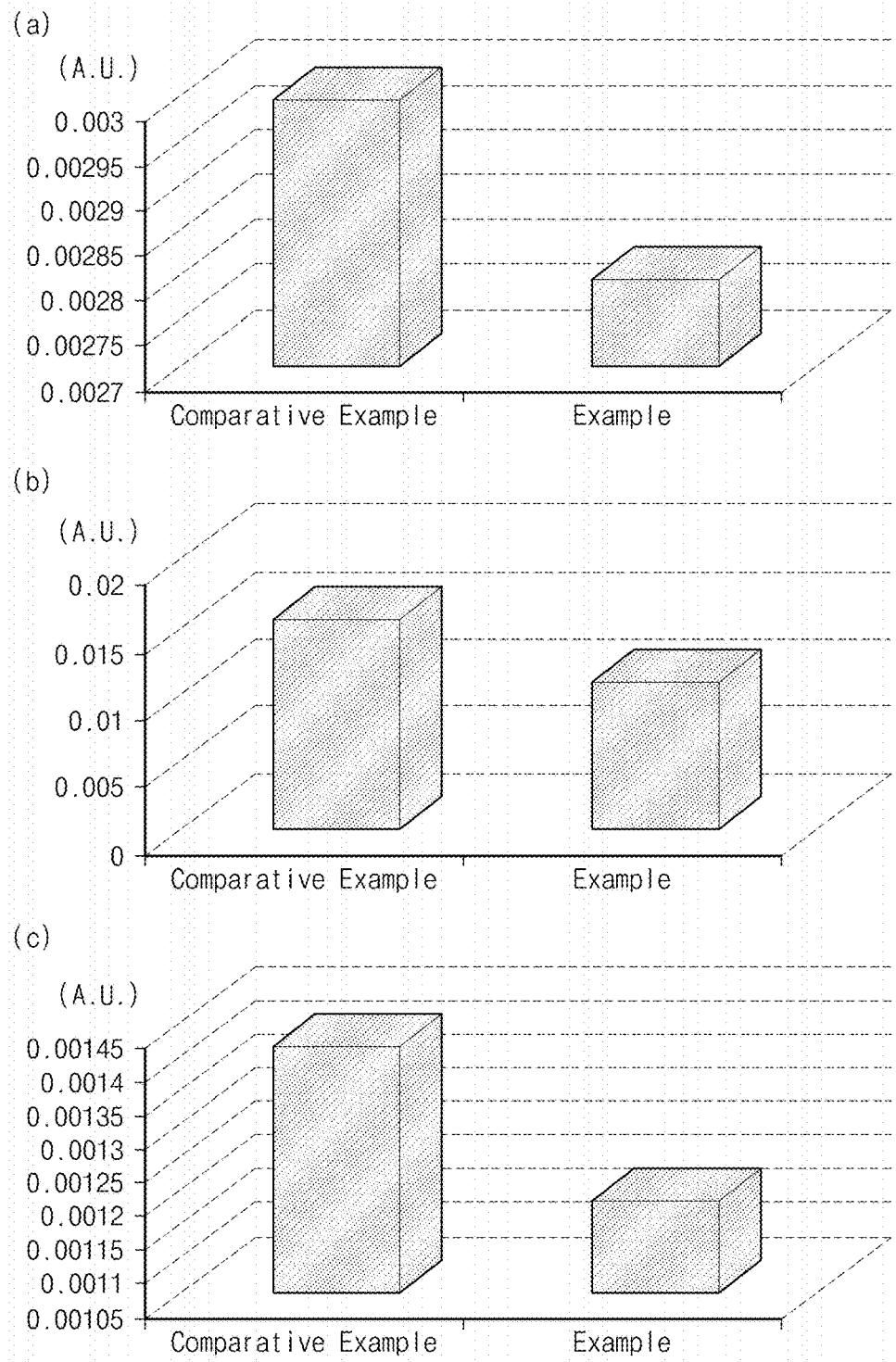

FIGS. 9 and 10 are graphs showing results of analyzing surface components of Comparative Examples and Examples. Surface component analysis was performed with time-of-flight secondary ion mass spectrometry (Tof-SIMS). FIG. 9 shows a relative size of mass peaks of components having a photoreactive group among the solids. In FIGS. 9 and 10, Comparative Example corresponds to Comparative Example 1 in Table 2, and Example corresponds to Example 2 in Table 2.

In FIG. 9, all of (a) to (c) correspond to a particular peak showing a photoreactive group. Referring to FIG. 9, a relative size of a particular peak indicating a photoreactive group is greater in Example compared to that of Comparative Example. Thus, by using the liquid crystal photo alignment agent of an embodiment, a ratio of disposing solids having a photoreactive group on the upper part of the alignment layer is increased, thereby improving the photo alignment characteristic of the alignment layer.

FIG. 10 shows a relative size of mass peaks of main components of the solids excluding the photoreactive group. The sizes of mass peaks shown in FIG. 10 are obtained by analyzing the surfaces of the alignment layers. Referring to (a) to (c) of FIG. 10, the size of mass peak in Example is relatively smaller than that of Comparative Example. Consequently, remaining solids without a photoreactive group are mainly disposed on lower parts of alignment layers adjacent to substrates rather than near the surfaces of alignment layers.

From the results of FIGS. 9 and 10, in an Example using the liquid crystal photo alignment agent of an embodiment, phase separation of the solid is facilitated compared to a Comparative Example, and thus an effect of improving the photo alignment characteristic during formation of the alignment layer is achieved.

Figure 11:
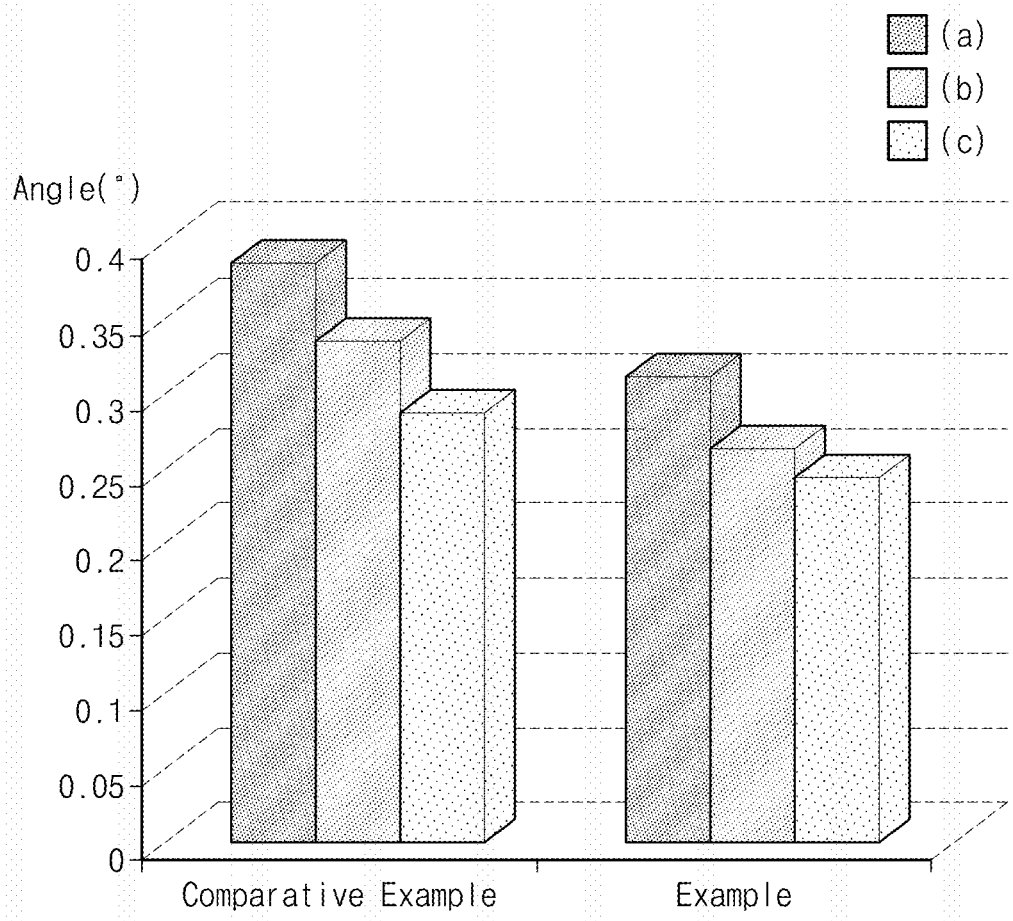
FIG. 11 is a graph showing residual image characteristics in the case where the liquid crystal photo alignment agent of an example of an embodiment is used and in a comparative example.

Evaluation of Property of Alignment Layer Formed by Using N-ethyl-2-pyrrolidine (NEP) as First Solvent Table 3 is an experimental result showing an effect of N-ethyl-2-pyrrolidine (NEP) which is a first solvent. In addition, FIG. 11 shows comparison of residual image characteristics in the case where the liquid crystal photo alignment agents of Comparative Examples and Examples in Table 3 below are used. Meanwhile, the liquid crystal photo alignment agents in Table 3 below were provided on substrates through the flexographic printing method unlike experiments in Examples described above.

TABLE 3

| | Composition ratio of liquid crystal photo alignment agent (%) | | | |
|---|---|---|---|---|
| | Solid | NMP | NEP | BCS |
| Comparative Example | 5.5 | 74.5 | 0 | 20 |
| Example | 6 | 54 | 20 | 20 |

Referring to the composition ratio in Table 3, the composition of the liquid crystal photo alignment agent in Example differs from that of Comparative Example in that NEP is further included as a first solvent. Composition numbers for each component are given as weight % based on the total weight of the liquid crystal photo alignment agent. The same solid as in Examples described above was used. In addition, other processes except the coating method of the liquid crystal photo alignment agent were the same as those in Example described above.

Referring to FIG. 11, it would be found that Δangle values are decreased in Examples relative to Comparative Examples. Through the result, the residual image characteristic of the liquid crystal photo alignment agent further including NEP is improved compared with that of the liquid crystal photo alignment agent composition without NEP.

Further, (a), (b), and (c) in FIG. 11 were respectively obtained at pre-bake temperatures of about 60° C., about 80° C., and about 100° C., and Δangle values in all pre-bake temperature conditions are lower in Example than Comparative Example. Consequently, the residual image characteristic is improved when the solvent composition in Example rather than that of the Comparative Example is used.

The liquid crystal photo alignment agent of an embodiment described above has an improved solvent composition, so that the coating property is improved to thereby form a uniform alignment layer. In addition, the alignment layer manufactured by using the liquid crystal photo alignment agent of an embodiment may have an improved photo alignment property, and thus the residual image characteristic of the display may be improved.

Further, the liquid crystal photo alignment agent of an embodiment may be effectively provided in the alignment layer coating process by an inkjet printing method.

The liquid crystal photo alignment agent of an embodiment may improve the coating property of the liquid crystal photo alignment agent by improving a solvent composition. Further, in the method of manufacturing a liquid crystal display of an embodiment, the liquid crystal display having an improved residual image characteristic may be manufactured by using the photo alignment agent of an embodiment having the improved solvent composition.

Although the preferable embodiments of the present invention have been described, it is understood that various changes and modifications can be made by one ordinary skilled in the art within the spirit and scope of the present invention as hereinafter claimed.

Thus, the technical scope of the disclosure is not limited to those described in detailed description of the specification, but should be defined by the claims.

What is claimed is:

1. A liquid crystal photo alignment agent, comprising:
   a solid comprising a polyimide polymer, cyclobutane dianhydride, diamine, or a combination thereof;
   a first solvent comprising N-methyl-2-pyrrolidone, N-ethyl-2-pyrrolidone, dimethyl sulfoxide, dimethyl formamide, γ-butyrolactone, propylene carbonate, or a combination thereof; and
   a second solvent comprising propylene glycol monobutyl ether and dipropylene glycol monomethyl ether,
   wherein the first solvent is included in an amount of about 50 wt % to about 80 wt % based on the total weight of the liquid crystal photo alignment agent; and
   the second solvent is included in an amount of about 15 wt % to about 40 wt % based on the total weight of the liquid crystal photo alignment agent, and the dipropylene glycol monomethyl ether is included in an amount of about 5 wt % to about 20 wt % based on the total weight of the liquid crystal photo alignment agent.

2. The liquid crystal photo alignment agent of claim 1, wherein the solid is included in an amount of about 2 wt % to about 10 wt % based on the total weight of the liquid crystal photo alignment agent.

3. The liquid crystal photo alignment agent of claim 1, wherein the first solvent is N-methyl-2-pyrrolidone and N-ethyl-2-pyrrolidone.

4. The liquid crystal photo alignment agent of claim 3, wherein the N-methyl-2-pyrrolidone is included in an amount of about 40 wt % to about 70 wt % based on the total weight of the liquid crystal photo alignment agent.

5. The liquid crystal photo alignment agent of claim 3, wherein the N-ethyl-2-pyrrolidone is included in an amount of about 10 wt % to about 40 wt % based on the total weight of the liquid crystal photo alignment agent.

6. The liquid crystal photo alignment agent of claim 1, wherein
   the first solvent is N-methyl-2-pyrrolidone and N-ethyl-2-pyrrolidone, and
   wherein, based on the total weight of the liquid crystal photo alignment agent, the liquid crystal photo alignment agent comprises about 2 wt % to about 10 wt % of the solid, about 40 wt % to about 70 wt % of the N-methyl-2-pyrrolidone, about 10 wt % to about 40 wt % of the N-ethyl-2-pyrrolidone, about 10 wt % to about 30 wt % of the propylene glycol monobutyl ether, and about 5 wt % to about 20 wt % of the dipropylene glycol monomethyl ether.

7. The liquid crystal photo alignment agent of claim 1, wherein the propylene glycol monobutyl ether is included in an amount of about 10 wt % to about 30 wt % based on the total weight of the liquid crystal photo alignment agent.

8. The liquid crystal photo alignment agent of claim 1, wherein the dipropylene glycol monomethyl ether is included in an amount of about 10 wt % to about 20 wt % based on the total weight of the liquid crystal photo alignment agent.

9. A liquid crystal display device, comprising:
   a first substrate including a first base substrate;
   a circuit layer disposed on the first base substrate;
   a pixel electrode layer disposed on the circuit layer; and
   a first alignment layer on the pixel electrode layer, wherein the first alignment layer comprises a liquid crystal photo alignment agent comprising:
      a solid comprising a polyimide polymer, cyclobutane dianhydride, diamine, or a combination thereof;
      a first solvent comprising N-methyl-2-pyrrolidone, N-ethyl-2-pyrrolidone, dimethyl sulfoxide, dimethyl formamide, γ-butyrolactone, propylene carbonate, or a combination thereof; and
      a second solvent comprising propylene glycol monobutyl ether and dipropylene glycol monomethyl ether;
      wherein the first solvent is included in an amount of about 50 wt % to about 80 wt % based on the total weight of the liquid crystal photo alignment agent; and
      the propylene glycol monobutyl ether is included in an amount of about 10 wt % to about 30 wt % based on the total weight of the liquid crystal photo alignment agent and the dipropylene glycol monomethyl ether is included in an amount of about 5 wt % to about 20 wt % based on the total weight of the liquid crystal photo alignment agent.

10. The liquid crystal display of claim 6, wherein the liquid crystal display has Δangle of less than 0.3, wherein Δangle is an angle between $S_{IN}$ and $S_{OFF}$, $S_{IN}$ indicates an angle at an initial alignment state of a liquid crystal in the absence of an electric field, and $S_{ON}$ indicates an angle at an alignment state of a liquid crystal under in the presence of an electric field.

* * * * *